June 3, 1958     K. T. KSIESKI     2,837,103
VALVE WITH INERTIA LOCKING MECHANISM Filed Sept. 21, 1954     5 Sheets-Sheet 5

INVENTOR.
KAZIMIERZ T. KSIESKI
BY
*Frank H. Harmon*
ATTORNEY

United States Patent Office 2,837,103
Patented June 3, 1958

2,837,103

VALVE WITH INERTIA LOCKING MECHANISM

Kazimierz T. Ksieski, Corry, Pa., assignor to Aero Supply Manufacturing Company, Inc., Corry, Pa., a corporation of New York Application September 21, 1954, Serial No. 457,494

11 Claims. (Cl. 137—38)

The invention relates in general to improvements in fluid carrying systems, such as those employed in aircraft fuel and oil systems, and more particularly to fluid control valves and automatic control means therefor.

In order to prevent displacement of large quantities of fluids in aircraft tanks, and attending undesired shifts of center of gravity of the aircraft and instability thereof, while under certain flight conditions, the tanks are in an unusual position or are subjected to accelerations, the large tanks are usually divided into smaller compartments by means of baffles, or a number of small interconnected tanks are substituted for a large one.

In order to increase the effectiveness of tank compartmentation and also to prevent fluid from flooding the vent pipes under the said flight conditions, flapper, or check valves may be mounted in ports connecting tank compartments or at the inlets to vent pipes. However, the conventional flapper or check valves permit one-directional flow only. In some aircraft installations, particularly in fuel systems being refuelled under pressure from a single point, an unrestricted two-directional flow is required through the said ports when the aircraft is in parking position or in normal level flight. In such aircraft, closing of fuel passages between tanks, or to the vent pipes should occur only in certain aircraft attitudes or during maneuvers in which accelerations causing undesirable fluid movement occur.

It is therefore one of the primary objects of my invention to provide a flapper valve with a locking mechanism that will be sensitive to changes of position and to inertia forces so as to be adapted to lock the valve in the open position when the valve is in normal attitude and under static conditions and to unlock the valve when in certain positions or when the valve is subjected to certain predetermined accelerations.

Another object is to provide a flapper valve assembly so pivotally suspended as to be gravity urged toward closed position and a weighted member pivotally connected to the flapper valve assembly so as to be adapted to control the operation of the valve and carrying a locking device to lock the valve in open position and to so locate the pivoted weighted member with respect to the valve assembly that it will maintain the valve open against the weight of the valve assembly, control the movement of the valve into closed position under acceleration forces and to provide the moment required to open the valve upon the discontinuance of such acceleration forces.

A further object is to provide a flapper valve assembly and a pivoted weighted member carried thereby so arranged that the same weighted member will supply the forces necessary for automatically engaging and disengaging the mechanism for locking the valve in open position and for holding the valve positively locked in open position when no acceleration forces, other than positive gravity, are present.

With the foregoing and other objects in view, the invention resides in the combination of parts and in the details of construction hereinafter set forth in the following specification and appended claims, certain embodiments thereof being illustrated in the accompanying drawings, in which:

Figure 1:
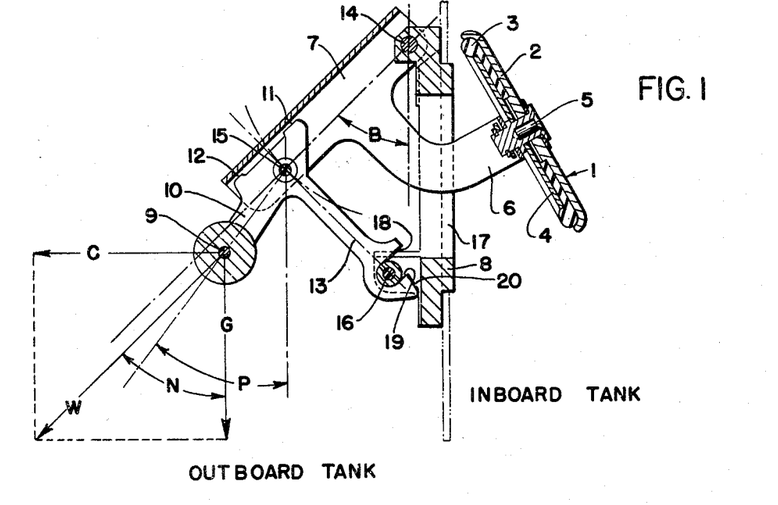
Figure 1 is a view in vertical section of my improved flapper valve assembly installed on a vertical bulkhead separating two liquid containing compartments, the valve being shown locked in the open position.

Referring more particularly to the drawings, I have shown in Figure 1 a flapper check valve assembly 1 comprising a valve plug 2, a valve seal 3 and a retainer 4 held together by means of a rivet 5 and attached pivotally floatingly to the extensions 6 of a bracket 7. The bracket 7 is pivotally attached to a valve flange 8 mounted on a bulkhead separating two adjacent liquid containing aircraft tanks designated as the inboard and the outboard tank. A ballast, or weighted member, 9 is fixedly attached to a rock member 10 which itself is pivotally mounted on the bracket 7 of the flapper valve assembly. The movement of the rock member 10 with respect to the bracket 7 is limited by two stops 11 and 12. The rock member 10 is provided with a locking hook 13 which extends in the direction tangential to the circle traced from the pivot 14 as center with a radius 14—15.

In the open position of the valve as in Figure 1, the hook 13 engages a roller 16 rotatably mounted on the flange 8. The weight of the ballast 9 produces a moment tending to rotate the rock member 10 and the hook 13 in a counter-clockwise direction so as to hold the hook 13 positively engaged against the roller 16.

The flow of fluid through the valve port 17 in the bulkhead between the two tanks produces forces tending to rotate the valve assembly around the pivot 14 in the same direction as the direction of liquid flow. This rotation is opposed by the hook 13 in its locked engagement with roller 16. Since the line connecting the centers of pins 15 and 16 is tangential to the circle traced from the center of the pivot 14 and since the faces 18 and 19 of the hook 13 are perpendicular to the above line drawn through pins 15 and 16, the moment produced by the flow of fluid through the valve port 17 cannot create forces which could disengage the hook 13. Thus, the valve remains safely locked independently of the magnitude of forces acting on the flapper valve assembly.

The angle P between the center line connecting centers of the ballast 9 and pivot 15 and between the vertical direction can be equal or sharper than the angle B between the lines connecting centers of pivot points 14 and 15 and the vertical direction. These angles determine the degree of sensitiveness of the latch mechanism consisting of the said rock member 10, ballast 9, and hook 13, as well as the response of the valve itself to accelerations to which the valve is subjected.

As previously stated, the illustration of Figure 1 represents the valve being mounted on a bulkhead separating two aircraft wing tanks. During certain maneuvers of the aircraft, such as a roll or spin, the valve is subjected, beside the usual gravity accelerations, to centrifugal accelerations, which in the illustration of Figure 1, will be directed parallel the vector C. These accelerations will produce a centrifugal force C, tending to rotate the ballast 9 in a clockwise direction.

Figures 2, 3:
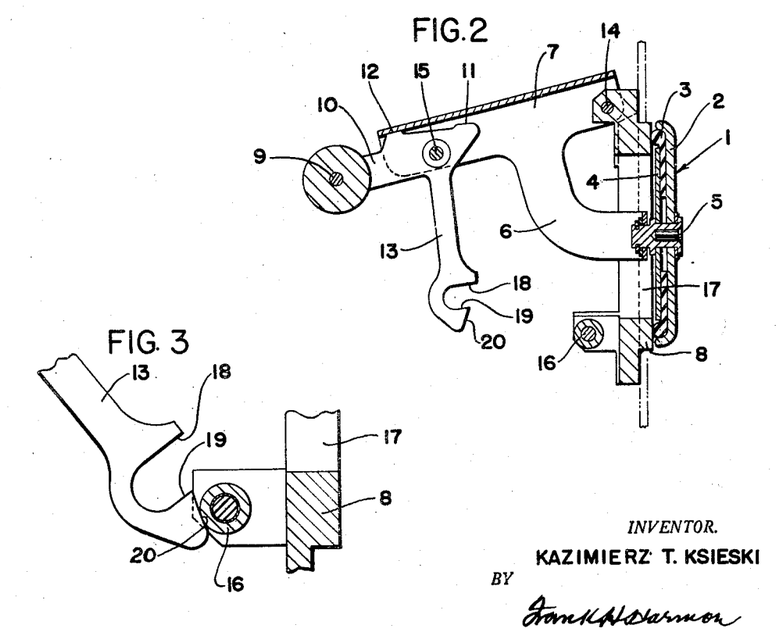
Figure 2 is a view in vertical section of the same valve as Figure 1, showing the valve unlocked and in the closed position.
Figure 3 is a fragmentary view of a detail of the inertia latch, of the type shown in Figure 1 and Figure 2, showing the valve latch at the moment of engagement before becoming locked.

This centrifugal force C can be added geometrically to the gravity force G producing a resultant force W. When the angle N between the direction of the force W and the vertical direction exceeds the angle P the latch rotates in a clockwise direction and the hook 13 unlocks. The valve is now free to be moved into the closed position by fuel flowing from the inboard to the outboard tank under the action of the centrifugal forces. Independently of the action of fuel, the valve gradually closes under the action of the force W from the moment on when N exceeds B. Figure 2 shows the valve in the closed position. It should be noted that in order to simplify the above analysis, the weight of the valve of the bracket and of the latch mechanism has been ignored.

The directions of forces C and G would be correct only in the theoretical case of a perfectly flat spin maneuver of the aircraft. In case of a roll of the aircraft, the direction of the force G changes with respect to the position of the valve. In general, the force W is the resultant of all forces acting on the ballast 9 in the plane of motion of the said valve mechanism.

When the centrifugal accelerations subside, the valve returns to the open position. The stops 11 and 12 limit the movement of the hook 13 to such a small angle that during the returning stroke, the roller 16 meets the hook 13 within the range of the track 20. Figure 3 shows the hook engaging the roller 16. The track 20 and the stop 18 direct the hook into the proper engagement with the roller 16.

Figures 4, 5, 6:
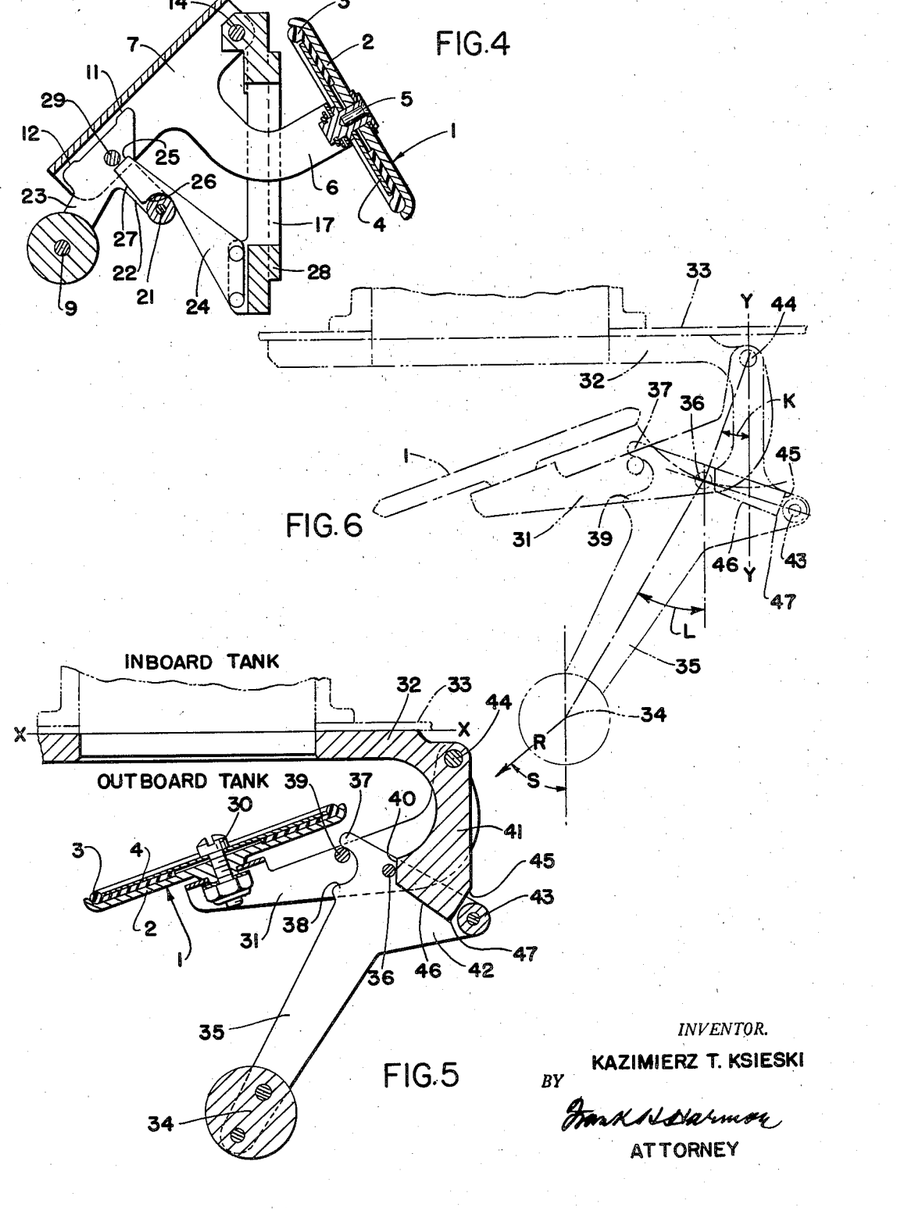
Figure 4 is a view in vertical section of a flapper valve mounted on a vertical bulkhead and incorporating a modified form of the inertia valve latch.
Figure 5 is a view in vertical section of a flapper valve mounted on a horizontal bulkhead dividing two liquid containing tanks and incorporating a modified form of the inertia valve latch.
Figure 6 is a diagrammatic view showing the geometry of the inertia valve latch mechanism of the valve of the type shown in Figure 5 in the horizontal position of the aircraft.

Figure 4 shows a vertical section of a flapper valve mounted on a vertical bulkhead incorporating a modified form of the inertia latch. In this type of latch a roller 21 is mounted on the extension 22 of the rock member 23. The cam 24 comprising stops 25 and 26 and the track 27 is fixedly attached to the valve flange 28. When the valve returns to the open position, first the roller 21 contacts the track 27. Next, the pivot 29 butts against the stop 25. In this arrangement the distance between stops 25 and 26 can be so selected that a small gap exists between the roller 21 and the stop 26 when the mechanism is engaged. The engagement and disengagement of the mechanism can be effected without the roller 21 ever contacting the stop 26. Due to the absence of friction between the roller 21 and the stop 26 when the latch is locking or unlocking, the operation of this type of latch is particularly smooth. Consequently, a lighter ballast 9 can be used than in case of the latch shown on Figures 1 through 3.

The feature which is characteristic to the above described valves shown in Figures 1 to 4, inclusive, is the utilization of the same ballast for two purposes, namely, that of controlling the operation of the valve and that of operating the latch locking the valve in the open position. The ballast 9 is so positioned with respect to other valve components that it holds the valve in open position against the weight of the valve plug assembly, controls the movement of the valve into closed position under accelerations to which it has been made sensitive and finally provides the moment required to open the valve when the aforementioned accelerations have subsided.

On the other hand, the same ballast supplies forces necessary for engaging and disengaging of the locking mechanism of the valve and for holding the valve positively locked when no other accelerations than the positive gravity are present.

Figure 5 illustrates an alterative form of the valve, which incorporates the same basic components as the valve shown in Figure 4. They are, however, arranged in a different manner. Here, the valve is adapted for mounting in horizontal position. It may be used on a bulkhead separating tanks located one on the top of another or at the inlet to a tank vent pipe. The valve remains locked in the open position when subjected only to positive gravity accelerations and in this position permits the flow of liquids in both directions without the risk of being sucked into the closed position. Under negative gravity, accelerations, including the flight in inverted position, the valve automatically unlocks and closes so as to prevent liquid from being spilled out of the tank.

The inlet to vent pipe is usually located at the top panel of the tank as far forward as possible, so that in the climb attitude of the aircraft the air space in the tank is adequately vented and the expanding air and fuel vapors may escape easily from the tank. In this location, however, the inlet to vent pipes is often flooded with fuel under dive condition of the aircraft and some quantity of liquid is lost through the vent pipe.

The ballast of the valve, as shown in Figure 5, may be so arranged that it will unlock the latch and facilitate closing of the valve when the angle of dive of the aircraft exceeds a predetermined magnitude. Here, the flapper valve assembly 1 includes a valve plug 2, a seal 3 and a retainer 4 clamped together by the screw 30 and attached pivotally and floatingly to the bracket 31. The bracket 31 is pivotally attached to the valve flange 32 mounted to the tank panel 33. The ballast 34 is fixedly attached to the rock member 35 which can rotate around the pivot 36 within the angle limited by stops 37 and 38 and the pin 39. The pin 39 as well as the pivot 36 are fixedly attached to the bracket 31. In the open position of the valve, the pivot 36 abuts against the stop 40 on a pylon 41 which extends downward from the flange 32. The rock member 35 is provided with an arm 42 carrying the roller 43. The position of the arm 42 is such that when the valve is locked, the line connecting the centers of the pivot 36 and the roller 43 is tangential to the circle traced from the pivot 44 of the bracket 32 as center with the radius 36—44, as shown in Figure 6. When the valve is subjected to positive gravity acceleration only, the weight of ballast 34 exerts a moment which tends to rotate the rock member 35 in the counterclockwise direction. The rotation of the rock member 35 is prevented by the stop 37 abutting against the pin 39. In this position of the rock arm, however, the roller 43 has already engaged the stop 45 on the pylon 41 so that the valve is locked in the open position.

The valve mechanism unlocks when the valve is subjected to such accelerations that the ballast 34 produces a moment tending to rotate the rock member 35 in a clockwise direction. This will occur under negative gravity conditions or in such a position of the aircraft where the angle S in Figure 6 between the direction of the force R, which is the resultant of forces acting on the ballast 34, and the line parallel to the axis $y$—$y$ exceeds the angle L. The angle L is the angle between centers of pivot 36 and ballast 34 and the line parallel to $y$—$y$. The axis $y$—$y$ is parallel to the center line of the valve port. When the angle S exceeds the angle K, the angle between the centers of pivots 36 and 44 and the axis $y$—$y$, the ballast 34 exerts a force which moves the bracket 31 and the flapper assembly 1 toward the closed position.

When the negative gravity accelerations subside, or the aircraft levels out after a dive, the valve opens under the action of the weight of the ballast 34 assisted by the weight of the rock member 35, flapper assembly 1 and a substantial part of the weight of the bracket 31. During the returning stroke, the stops 37 and 38 guide the roller 43 so that it hits the track 46 of the pylon 41 and slides along this track. Immediately after the roller 43 has passed the end 47 of the track 46 the pivot 36 hits the stop 40, whereupon the forward movement of the roller 43 is stopped and the roller falls into the engagement with the stop 45 under the moment of the weight of the ballast 34.

In the valve configuration as shown in Figures 1, 2 and 4, the ballast must be sufficiently heavy so that in the open position of the valve its moment be greater than the opposing moment of the weight of the flapper valve assembly 1.

In the valve assembly of the type shown in Figure 5, both moments act in the same direction so that the ballast 34 may be actually smaller than the ballast 9 shown in Figures 1, 2 and 4. One of the characteristic features of all the modifications of valves described is such an arrangement of the components of the latch that under accelerations to which the valve is subjected, the moments of their weights act in the same direction as the moment of the ballast so as to contribute effectively to the operation of the ballast.

Figure 7:
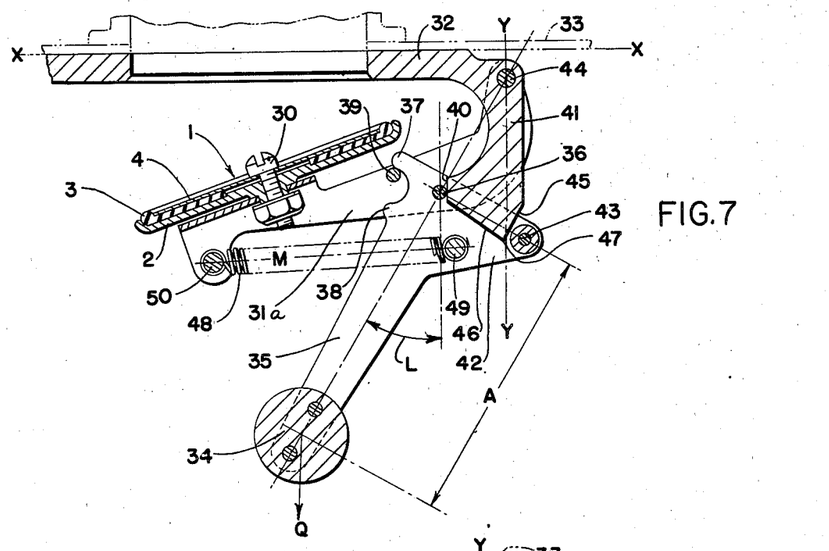
Figure 7 is a view in vertical section of a flapper valve mounted on a horizontal bulkhead and incorporating another modified form of the inertia valve latch.

In order to assure a positive locking of the valve, Figure 5, in the at-rest position of the aircraft with sufficient margin of safety to allow for accidental deviation of the aircraft from the correct flight attitude and also in order to assure a prompt response of the valve to negative gravity accelerations, the angles L and K in Figure 6 should not be considerably less than 30°. Assuming further that 8° is required to unlock the latch the minimum angle of dive at which the latch would unlock and the valve would become free to be pushed into the closed position by the flow of fuel would be 38°. If the travel of the flapper 1 is 20°, the valve will close under the action of only its mechanism not earlier than at 58° dive. Since the valve, once unlocked, moves to the closed position under a very light force of liquid flow, it may be assumed for all practical purposes that the valve will prevent spillage of liquid into vent pipes at angles of dive higher than 38°. If unlocking of the valve at smaller angles of dive is required, this valve may be readily modified to incorporate a device accelerating the action of the ballast 34 in nose-down position of the aircraft. One of such devices is shown in Figure 7, which shows a valve having the same components as the valve shown in Figure 5. This valve, however, incorporates a spring 48 extended between the pin 49 fixedly attached to the ballast arm 35 and the pin 50 fixedly attached to the bracket 31a. When the valve of Figure 7 is locked in the open position and subjected to the positive gravity acceleration only, the moment of weight of the ballast 34 holding the latch locked is $M=QA \sin L$, where Q is the weight of the ballast 34. The weight of the rock member 35 and arm 42 has been neglected for simplicity sake. A is the distance between the centers of 36 and 34 and L is the angle between A and the vertical line parallel to $y$—$y$ as in Figure 6.

Assuming that $L=30°$, then $M=QA \sin 30°=0.5QA$. Let us assume also that the tension of the spring 48 is such that its moment M tending to rotate the rock member 35 clockwise around the pivot 36, balances half of the moment of the ballast 34. Thus, $M_1=0.25QA$.

Figure 8:
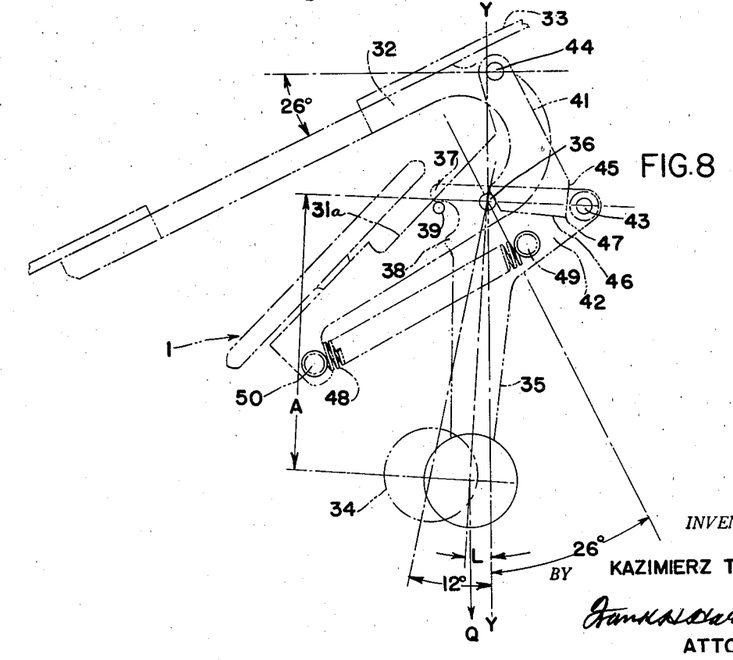
Figure 8 is a diagrammatic view showing the geometry of the inertia valve latch mechanism of the valve of the type shown in Figure 7 at the nose-down attitude of the aircraft.

When the aircraft moves into a diving position L gradually decreases. At the nose-down attitude of the aircraft of 26° the angle L has decreased to 4°, as shown in Figure 8. In order to unlock the latch, the rock member has to be rotated 8° clockwise, or in other words, it has to be pulled to $L_1=12°$ from vertical. In order to achieve this, a moment $M_2=QA \sin 12°=0.208QA$ would be required. Let it be assumed that the rate of the spring 48 is such that in the contracted position, after the rock member 35 has rotated 8°, the spring would still exert a moment $M_3$ equal to 90% of $M_1$ or $$M_3=0.225QA$$

Since $M_3>M_2$, such a spring will be able to unlock the latch at 26° of dive of the aircraft.

The use of a spring in order to reduce the angle of dive at which the valve unlocks reduces the moment holding the valve locked in the horizontal position of the aircraft. This is not particularly objectionable and can be easily compensated by the increase of the weight of the ballast. Less desirable, however, is the fact that while unlocking the valve in nose-down conditions, the latch mechanism operates in the region of its neutral position, where the tangential component of the gravity force is small. Consequently, the mechanism has little stability against parasite forces applied tangentially, or in other words, the locking mechanism becomes very sensitive to forward accelerations or decelerations when the aircraft is in nose-down attitude.

Figure 9:
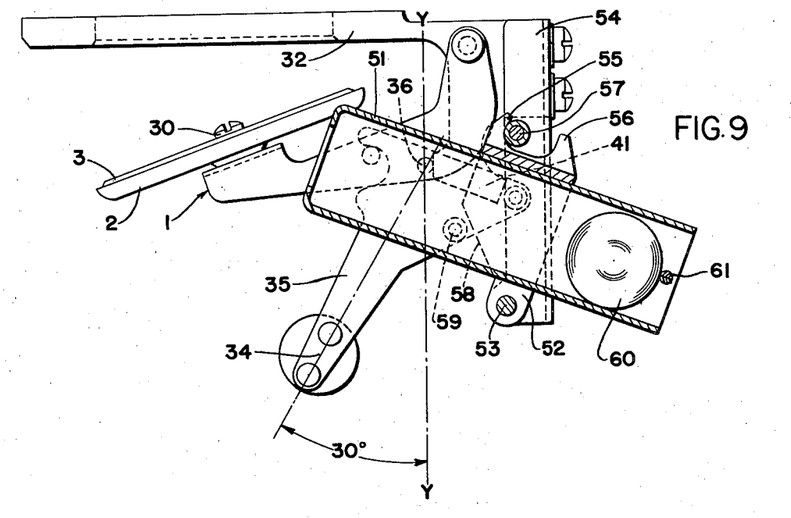
Figure 9 is a view in vertical section of the flapper valve mounted on a horizontal bulkhead and incorporating another modified form of the inertia valve latch.
Figure 10:
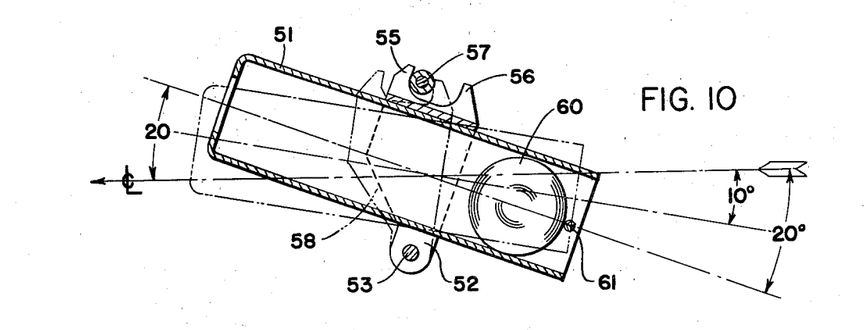
Figure 10 is a diagrammatic view showing the geometry of a detail of the modified form of the inertia valve latch of the type shown in Figure 9 when the aircraft is in the horizontal attitude.
Figure 11:
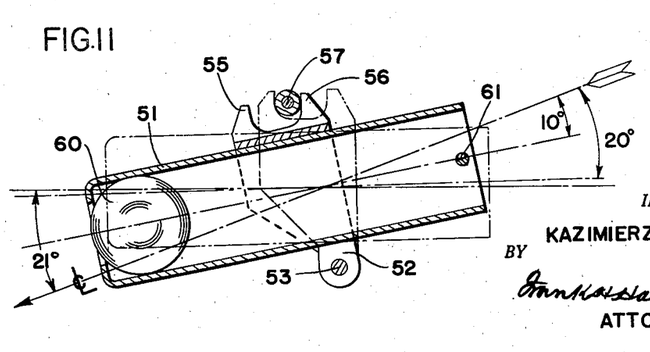
Figure 11 is a diagrammatic view showing the geometry of a detail of the modified form of the inertia valve latch of the type shown in Figure 9 when the aircraft is in the nose-down attitude.

The stability of the valve locking mechanism may be considerably increased in the nose-down attitude of the aircraft by addition of the device shown in Figures 9, 10 and 11. The valve shown in Figure 9 comprises all the components of the valve illustrated in Figure 5 and the operation of these components remains the same. However, to reduce the angle of dive at which the latch unlocks, a trigger, or off-center mechanism, has been added. This mechanism consists of a tube 51 held in a clamp 52 which can rock around the pivot 53. The pivot 53 is fixedly attached to the bracket 54, which is fixedly attached to the pylon 41 extending from the valve flange 32. The clamp 52 is provided with fingers 55 and 56 which, together with the pin 57, fixedly attached to the said bracket 54, limit the amplitude of movement of the tube 51. One side of the clamp 52 is developed as a cam 58. A pin 59 fixedly attached to the rock member 35 is disposed in the path of the cam 58 so that when the tube 51 rocks counter-clockwise the cam 58 strikes the pin 59 and the movement of the tube is transmitted to the rock member 35.

A metal ball 60 of a diameter smaller than the internal diameter of the tube 51 is inserted in this tube, so that it can roll freely from one end of the tube to another. In order to prevent the ball from falling out of the tube 51, one end of the tube is swaged and the other closed by a cotter pin 61.

The fingers 55 and 56 are so disposed relatively to the pin 57 that when the aircraft is in the horizontal position, the tube 51 can rock only between 10° and 20° from the level with the rear end of the tube pointing downwards, as shown in Figure 10. Thus, in all attitudes of the aircraft up to 20° nose-down, the ball 60 stays at the rear end of the tube 51 holding that end in the down position. In this position of the tube a small gap exists between the cam 58 and the pin 59. This permits the latch of the valve to function freely without being affected by the trigger mechanism under all operational conditions except the dive. If the rock member 35 is so disposed that in the horizontal attitude of the aircraft the angle between the line connecting centers 34—36 and the vertical axis y—y is 30°, the ballast 34 would keep the latch locked up to 30° of dive and would unlock it through the next 8°. However, as soon as the angle of dive exceeds 20°, the tube 51 under the guidance of the pin 57 swings over the horizontal position. The ball 60 rolls therefore to the forward end of the tube 51 and rocks it counter-clockwise 10° until stopped by the finger 56 hitting the pin 57. The movement of the tube 51 is transmitted through the cam 58 and pin 59 to the rock member 35 which swings clockwise and the latch unlocks. Figure 11 shows the geometry of the trigger mechanism after it has rocked anticlockwise at the angle of dive of 21°.

As soon as the ball rolls to the forward end of the tube, the operational torque of the trigger mechanism reaches its near maximum magnitude. On the other hand, the opposing torque produced by the moment of the weight of the ballast 34 is small since at angles of dive over 20° the rock member 35 is near its neutral position. Thus, the unlocking of the valve can be achieved by a relatively small and light ball 60. The operation of the trigger mechanism is instantaneous and so is the unlocking of the latch as soon as 20° of dive is exceeded.

Figure 12:
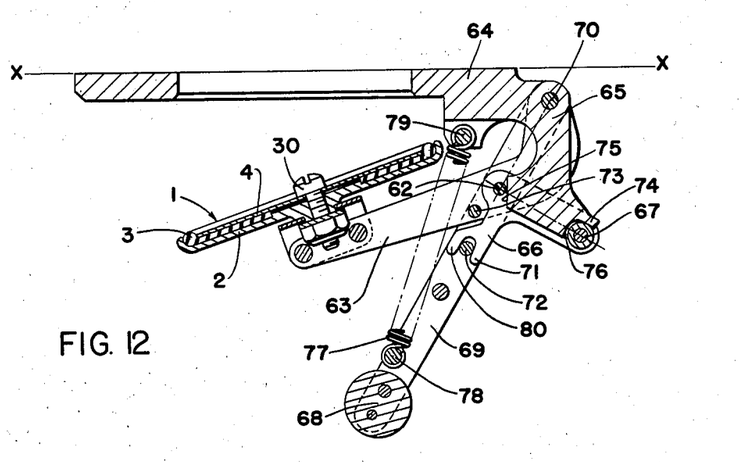
Figure 12 is a view in vertical section of the flapper valve mounted on a horizontal bulkhead and incorporating another modified form of inertia valve latch.

Figure 12 represents another alternate construction of the valve in accordance with my invention. Here, the valve comprises the usual flapper assembly 1, mounted floatingly on the bracket 63, the flange 64, the pylon 65, and the rock member 66 pivotally mounted on the bracket 63 and carrying the roller 67. The ballast 68, however, is fixedly attached to a separate lever 69 rotating around the same pivot 70 as the bracket 63. The rock member 66 is provided with two fingers 80 and 71 which are disposed in the path of the pin 72 fixedly attached to the lever 69. The movement of the rock member 66 is limited by a pin 73 fixedly attached to the bracket 63 and by a stop 74 provided on the pylon 65 in addition to the usual stops 75 and 76. A spring 77 is extended between the pin 78 fixedly attached to the lever 69 and the pin 79 fixedly attached to the flange 64.

The operation of the valve shown in Figure 12 is similar to the operation of the valve shown in Figure 7. Since the angle between the line connecting the centers of pivots 62 and 70 and the line connecting the centers of pivot 62 and roller 67 is 90° when the latch is in the locked position, the valve cannot be closed by any force acting on the flapper assembly 1. At the horizontal attitude of the aircraft with no other accelerations present than the positive gravity acceleration, the weight exerted by the ballast 68 tends to rotate the lever 69 counterclockwise. The moment of the weight of the ballast 68 is transmitted through the pin 72 and finger 71 to the rock member 66 and presses the roller 67 against the stop 74 thus holding the latching locked.

Under negative gravity accelerations the ballast 68 rotates the lever clockwise, transmits the movement to the rock member 66 through the pin 72 and finger 80, and unlocks the latch. The rotation of the rock member 66 is stopped by the pin 73. The bracket 63 now swings together with the lever 69 towards the closed position of the valve. Similarly, as in the case of the valve shown in Figure 7, the spring 77 balances a part of the moment exerted by the weight of the ballast 68 and thus reduces the angle of dive at which the valve unlocks. However, being attached to the flange 64, the spring 77 exerts a pull on the valve mechanism after the latch is unlocked and accelerates the closing of the valve under the dive conditions. The attachment point 79 of the spring 77 can be so located with respect to points 70 and 78 that the contraction of the spring during the closing movement of the valve is small and the spring does not slacken in the closed position of the valve.

The spring arrangement as shown in Figure 12 is particularly effective under certain roll conditions of the aircraft. The valves provided with inertia latches should be so mounted in the aircraft that the planes in which their mechanisms rotate be parallel to the planes of action of main forces by which the operation of these valves is controlled. In airplane fuselage tanks, mounted close to the center line of the aircraft, the centrifugal accelerations directed spanwise are almost negligible. If a valve with an inertia latch is used in the airplane fuselage tank, for instance for the purpose of protection of the vent pipe against flooding by fuel, its operation will be affected mainly by positive and negative gravity accelerations and by the angle of climb and dive of the aircraft. The valve should be mounted so that the plane in which its mechanism rotates be parallel to the plane of symmetry of the aircraft and that the flapper point forward. In this position, the valve assemblies shown in Figure 5, Figure 7, or Figure 12, will be rotated around the axis parallel to X—X during the roll of the aircraft. If the valve assembly shown in Figure 5 is rotated around the axis X—X so slowly that the centrifugal accelerations can be neglected, the valve will remain locked in the open position until rotated 90° and will unlock and close soon after 90° of rotation is exceeded. The spring 48 will unlock the valve of the type shown in Figure 7 before 90° of rotation is reached, but will not accelerate the actual closing of the flapper.

Figure 13:
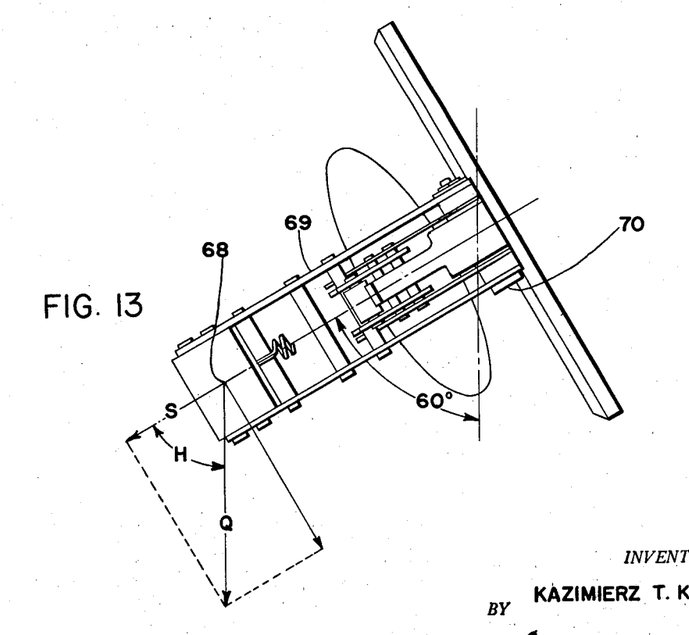
Figure 13 is a view in the direction of axis X—X of the inertia valve latch shown in Figure 12, showing the disposition of forces which act on the pivoted weighted member of the inertia valve latch.

The closing of the flapper can be accelerated, however, by the arrangement of the spring as in the valve assembly shown in Figure 12. If Q is the weight of the ballast 68 the moment which holds the valve locked against the opposition of the spring 77 decreases proportionally to $S = Q \cos H$, Figure 13, when the valve is rotated through the angle H around the axis X—X, Figure 12. In Figure 13 the valve is shown in the direction of the axis X—X. At 60° of rotation, this moment is reduced to one-half of the magnitude which it had at $H=0°$. If the moment exerted by the spring 77 in extended position is half of the moment exerted by Q, weights of other components of the mechanism and the friction losses neglected, the valve will begin to close as soon as 60° of roll is exceeded. In some applications, where spilling of small quantities of fuel into vent pipes is undesirable, the valve assembly shown in Figure 12 will offer superior performance under slow roll conditions of the aircraft.

Thus, from the foregoing, it will be seen that I have provided in a fluid carrying system employing a plurality of communicating liquid containing compartments, a liquid flow control valve, and automatic control means therefor, in which the control valve is a flapper valve that is pivotally suspended to be gravity urged toward closed position, as shown in Figures 1 to 4, inclusive, or toward open position, as shown in Figures 5 to 13, inclusive, and provided with a latch mechanism responsive to movements of a pendulum ballast which, whether the weight is rigid with, or shiftably mounted on, the arm of the pendulum, the single pendulum ballast is capable of controlling the operation of the valve and of operating the latch to lock the valve in open position. The single ballast is so arranged with respect to the valve assembly that the valve is held open. The single ballast also controls the movement of the valve into closed position under acceleration forces and provides the moment necessary to open the valve when such acceleration forces terminate. In other words, the single ballast supplies the forces required for engaging and disengaging the valve locking mechanism and for maintaining the valve in locked position when no accelerations other than positive gravity exist.

In Figures 1 to 4, inclusive, the valve is constructed for vertical bulkheads and the flapper is gravity urged toward closed position under static conditions and the ballast serves to move the flapper into open position. In case of prevailing vertical accelerations, whether positive or negative, the forces acting on the flapper and on the ballast are conflicting. The moment of the weight of the ballast with respect to the main pivot point 14 of the assembly must be higher than the opposing moment of the weight of the flapper in order to operate the valve. The valve is so constructed as to close under accelerations acting in the direction of vector C, which is parallel to the center line of the valve port. Then the moments of the inertia forces of the flapper and of the ballast are acting in the same direction and are added. Thus, in the case of such valves for vertical bulkheads, the ballast functions to open the flapper under static conditions and to operate the locking mechanism.

In the case of valves for horizontal bulkheads, as shown in Figures 5 to 13, inclusive, the flapper is gravity urged toward the open position. The direction of moments of gravity and inertia forces, with respect to the main pivot point 44 of the assembly, due to the mass of the flapper and of the ballast, is concurrent under most conditions. Thus, the primary purpose of the ballast is to operate the locking mechanism, although the ballast improves the operation of the flapper by permitting the flapper to open against higher pressure differential in tanks or to close under lower inertia force than would be possible without the ballast.

The off-center, or trigger mechanism of Figures 9, 10 and 11 may be considered as an improved version of an unstable pendulum. When the mechanism is rocked over the neutral position, the approximately maximum positive moment of the weight of the rolling element changes almost instantaneously into the approximately maximum negative moment. Its use provokes an instantaneous action at a definite angle of inclination. The weight and disposition of the pendulum ballast 34 and of the rolling element should be perfectly matched. At the angle of inclination at which the off-center mechanism is required to act, the pendulum ballast must be close to its neutral position so that the tangential force opposing its shift be close to the minimum. The off-center mechanism passes through its neutral point at the predetermined angle of inclination of the valve, but since it develops its maximum moment immediately after the neutral position, it requires a very light weight rolling element to overpower the resistance of the pendulum ballast.

It is to be noted that the latching means in Figures 1, 2 and 3 includes a hook 13, carried by member 7 of the valve assembly, to engage a roller 16, which latter is mounted on a bracket that is rigid with the valve flange 8. Valve flange 8 is rigid with the bulkhead. The reverse of this is present in Figure 4 where the hook 24 is rigid with the valve flange and the roller 21 to be engaged by the hook is carried by member 7. It is to be therefore understood in connection with the interpretation of some of the appended claims, that where the locking hook, or the roller member to be engaged by the hook, is defined as being connected to the wall, or bulkhead, this terminology is not meant to necessarily imply a direct connection to the bulkhead, but only to imply a connection in contrast to a connection to the valve assembly.

I claim:

1. In a liquid carrying system including a plurality of liquid containing compartments and a wall separating the same, a communicating port in said wall between said compartments, a valve assembly for controlling liquid flow through said port, said valve assembly being pivotally connected to said wall and including a flapper check valve for engaging said port, a pivotally, pendulously mounted ballast arm operatively connected to said flapper check valve, locking means associated with said valve assembly and ballast arm and comprising a locking arm and a member to be releasably engaged thereby, said ballast arm, in response to normal positive static gravity forces, being so mounted and arranged as to cooperate with said valve assembly and locking means to bias said valve assembly and locking means to lock said valve assembly in valve open position, said mounting of the ballast arm also being positioned as to effect the unlocking of the valve assembly and movement of said valve into closed position under negative gravity forces or under predetermined inertia forces, discontinuance of said negative gravity or inertia forces and restoration of positive gravity forces effecting the repositioning of the valve to locked open position.

2. In a liquid carrying system including a plurality of liquid containing compartments and a wall separating the same, a communicating port in said wall between said compartments, a valve assembly for controlling liquid flow through said port, said valve assembly being pivotally connected to said wall and including a flapper check valve for engaging said port, a pivotally, pendulously mounted ballast arm operatively connected to said flapper check valve, locking means including a locking arm fixedly connected at one end to said ballast arm and being provided with a hook at its other end, means associated with the wall adjacent the port to receive the hooked end of the locking arm in locking engagement, and means to limit the pivotal movement of the ballast arm, said ballast arm in response to normal positive static gravity forces, being so mounted and arranged as to cooperate with said valve assembly and locking means to bias said valve assembly and locking means to lock said valve assembly in valve open position, said mounting of the ballast arm also being positioned as to effect the unlocking of the valve assembly and movement of said valve into a closed position under negative gravity forces or under predetermined inertia forces, discontinuance of said negative gravity or inertia forces and restoration of positive gravity forces effecting repositioning of the valve to locked open position.

3. In a liquid carrying system including a plurality of liquid containing compartments and a substantially vertical wall separating the same, said wall being provided with a port between the compartments, a valve assembly including a flapper valve for controlling liquid flow through said port, said valve assembly being pivotally connected to said wall above said port in order to be gravity urged toward a position to cause said valve to close said port, a pendulously suspended gravity responsive ballast arm pivotally connected to said valve assembly, locking means associated with said valve assembly and ballast arm and comprising a locking arm and a member to be releasably engaged thereby, said ballast arm, in response to normal positive static gravity forces, being so mounted and arranged as to cooperate with said valve assembly and locking means to bias said valve assembly and locking means to lock said valve assembly in valve open position, said mounting of the ballast arm also being positioned as to effect the unlocking of the valve assembly and movement of said valve into closed position under negative gravity forces or under predetermined inertia forces, discontinuance of said negative gravity or inertia forces and restoration of positive gravity forces effecting the repositioning of the valve to locked open position.

4. In a liquid carrying system including a plurality of liquid containing compartments and a substantially vertical wall separating the same, said wall being provided with a port between the compartments, a valve assembly including a flapper valve for controlling liquid flow through said port, said valve assembly being pivotally connected to said wall above said port in order to be gravity urged toward a position to cause said valve to close said port, a pendulously suspended gravity responsive ballast arm pivotally connected to said valve assembly, locking means including a locking arm fixedly connected to the ballast arm and a member carried by said wall to be releasably engaged by said locking arm, said ballast arm in response to normal positive static gravity forces, being so mounted and arranged as to cooperate with said valve assembly and locking means to bias said valve assembly and locking means to lock said valve assembly in valve open position, said mounting of the ballast arm also being positioned as to effect the unlocking of the valve assembly and movement of said valve into closed position under negative gravity forces or under predetermined inertia forces, discontinuance of said negative gravity or inertia forces and restoration of positive gravity forces effecting the repositioning of the valve to locked open position.

5. In a liquid carrying system including a plurality of liquid containing compartments, and a substantially vertical wall separating the same, a communicating port in said wall between said compartments, a valve assembly including a flapper valve for controlling liquid flow through said port, said valve assembly being pivotally connected to said wall and suspended to be gravity urged toward a position to cause said valve to close said port, a pendulously suspended gravity responsive weighted ballast arm pivotally connected to said valve assembly, locking means including a locking arm connected to said wall and a member carried by said weighted pendulum ballast arm to be releasably engaged by said locking arm, said ballast arm, in response to normal positive static gravity forces, being so mounted and arranged as to cooperate with said valve assembly and locking means to bias said valve assembly and locking means to lock said valve assembly in valve open position, said mounting of the ballast arm also being positioned as to effect the unlocking of the valve assembly and movement of said valve into closed position under negative gravity forces or under predetermined inertia forces, discontinuance of said negative gravity or inertia forces and restoration of positive gravity forces effecting the repositioning of the valve to locked open position.

6. In a liquid carrying system including a plurality of liquid containing compartments and a wall separating the same, a communicating port in said wall between said compartments, a valve assembly for controlling liquid flow through said port, said valve assembly including a bracket pivotally connected to said wall and including a flapper check valve for engaging said port and normally gravity urged to open said port, a pendulously suspended weighted ballast arm pivotally connected to the pivoted bracket of said valve assembly, a pylon rigid with said wall and comprising a ramp and stops, locking means associated with said valve assembly and pendulum ballast arm comprising a locking hook carried by said ballast arm and a pin on said pivoted bracket to engage releasably the said pylon, stop means on said ballast arm to limit the movement of the locking hook and direct it towards the track on the pylon, said ballast arm, in response to normal positive static gravity forces, being so mounted and arranged as to cooperate with said valve assembly and locking means to bias said valve assembly and locking means to lock said valve assembly in valve open position, said mounting of the ballast arm also being positioned as to effect the unlocking of the valve assembly and movement of said valve into closed position under negative gravity forces or under predetermined inertia forces, discontinuance of said negative gravity or inertia forces and restoration of positive gravity forces effecting the repositioning of the valve to locked open position.

7. In a liquid carrying system including a plurality of liquid containing compartments and a wall separating the same, a communicating port in said wall between said compartments, a valve assembly for controlling liquid flow through said port, said valve assembly including a bracket pivotally connected to said wall and including a flapper check valve for engaging said port and normally gravity actuated to open said port, a pendulously suspended weighted ballast arm pivotally connected to the pivoted bracket of said valve assembly, a pylon rigid with said wall and comprising a ramp and stops, locking means associated with said valve assembly and ballast arm comprising a locking hook carried by said pendulum ballast arm and a pin on said pivoted bracket to engage releasably the said pylon, stop means on said pendulum ballast arm to limit the movement of the locking hook and direct it towards the track on the pylon, said pendulum ballast arm, in response to positive gravity forces being adapted to actuate locking means to lock said valve assembly in open position, with said hook engaging said pylon and said pin abutting said pylon stop, contracting tension spring means connecting said valve bracket and said ballast arm, said ballast arm, in response to normal positive static gravity forces, being so mounted and arranged as to cooperate with said valve assembly and locking means to bias said valve assembly and locking means to lock said valve assembly in valve open position, said mounting of the ballast arm also being positioned as to effect the unlocking of the valve assembly and movement of said valve into closed position under negative gravity forces or under predetermined inertia forces, discontinuance of said negative gravity or inertia forces and restoration of positive gravity forces effecting the repositioning of the valve to locked open position, said spring means being adapted to accelerate movement of the ballast arm in disengaging the hook and to assist the movement of the valve into open position.

8. In a liquid carrying system including a plurality of liquid containing compartments and a wall separating the same, a communicating port in said wall between said compartments, a valve assembly for controlling liquid flow through said port, said valve assembly including a bracket pivotally connected to said wall and including a flapper check valve for engaging said port and normally gravity actuated to open said port, a pendulously suspended weighted ballast arm pivotally connected to said wall about the same pivot axis as said valve assembly, a pylon rigid with said wall and comprising a ramp and stops, locking means including a rock member pivotally connected to said pivoted bracket provided with fingers slidably engaging a pin carried by said pendulum ballast arm and with a locking hook adapted to releasably engage said pylon, stop means on said pendulum ballast arm to abut against the pylon stop, said ballast arm, in response to normal positive static gravity forces, being so mounted and arranged as to cooperate with said valve assembly and locking means to bias said valve assembly and locking means to lock said valve assembly in valve open position, contracting tension spring means connecting said pendulum ballast arm to said wall, said mounting of the ballast arm also being positioned as to effect the unlocking of the valve assembly and movement of said valve into closed position under negative gravity forces or under predetermined inertia forces, said contracting spring being adapted to accelerate the movement of the ballast arm in disengaging the hook and the closing movement of the valve, discontinuance of said negative gravity or inertia forces and restoration of positive gravity forces effecting the repositioning of the valve to locked open position.

9. In a liquid carrying system including a plurality of liquid containing compartments and a wall separating the same, a communicating port in said wall between said compartments, a valve assembly for controlling liquid flow through said port, said valve assembly including a bracket pivotally connected to said wall and including a flapper check valve for engaging said port and normally gravity urged to open said port, a pendulously suspended weighted ballast arm pivotally connected to the pivoted bracket of said valve assembly, a pylon rigid with said wall and comprising a track or ramp and stops, locking means associated with said valve assembly and pendulum ballast arm comprising a locking hook carried by said pendulum ballast arm and a pin on said pivoted bracket to engage releasably the said pylon, stop means on said pendulum ballast arm to limit the movement of the locking hook and direct it towards the track on the pylon, said pendulum ballast arm, in response to positive gravity forces being adapted to actuate said locking means to lock said valve assembly in open position with said hook engaging said pylon and said pin abutting against said pylon stop, a bracket pivotally connected to said wall provided with stop means engaging a pin fixedly attached to said wall to limit the extent of pivotal movements of said pivoted bracket which is provided also with a cam to engage a member fixedly attached to said pendulum ballast arm, an off-center assembly including a tube carried by said pivoted bracket, provided with stops at both ends and carrying a rolling weight element normally maintaining the said pivoted bracket in such position that the said cam is out of engagement with said member attached to said pendulum ballast arm, said ballast arm, in response to normal positive static gravity forces, being so mounted and arranged as to cooperate with said valve assembly and locking means to bias said valve assembly and locking means to lock said valve assembly in valve open position, said mounting of the ballast arm also being positioned as to effect the unlocking of the valve assembly and movement of said valve into closed position under negative gravity forces or under predetermined inertia forces, discontinuance of said negative gravity or inertia forces and restoration of positive gravity forces effecting the repositioning of the valve to locked open position, said off-center assembly being adapted upon rotation of said valve assembly around the axis parallel to the axis of pivot of said off-center assembly to swing in the direction of said rotation under the action of rolling weight element and through said cam engaging said member on the ballast arm to move said pendulum ballast arm to unlock said locking means associated with said valve assembly.

10. In a liquid carrying system including a plurality of liquid containing compartments, and a substantially horizontal wall separating the same, a communicating port in said wall between said compartments, a valve assembly including a flapper valve for controlling liquid flow through said port, said valve assembly being pivotally connected to said wall and suspended to be gravity urged toward a position to cause said valve to open said port, a pendulously suspended gravity responsive weighted ballast arm pivotally connected to said valve assembly, locking means associated with said valve assembly and pendulum ballast arm and comprising a locking arm and a member to be releasably engaged thereby, said ballast arm, in response to normal positive static gravity forces, being so mounted and arranged as to cooperate with said valve assembly and locking means to bias said valve assembly and locking means to lock said valve assembly in valve open position, said mounting of the ballast arm also being positioned as to effect the unlocking of the valve assembly and movement of said valve into closed position under negative gravity forces or under predetermined inertia forces, discontinuance of said negative gravity or inertia forces and restoration of positive gravity forces effecting the repositioning of the valve to locked open position.

11. In a liquid carrying system including a plurality of liquid containing compartments and a wall separating the same, a communicating port in said wall between said compartments, a valve assembly for controlling liquid flow through said port, said valve assembly being pivotally connected to said wall and including a flapper check valve for engaging said port, a pendulously suspended weighted ballast arm pivotally connected to said valve assembly, locking means including a latch member carried by said ballast arm to be releasably engaged by a locking arm connected to said wall, said latch member including stops to limit its movement, said locking arm including means for directing said member into engaged position and stops for holding said member in engaged position, said ballast arm, in response to normal positive static gravity forces, being so mounted and arranged as to cooperate with said valve assembly and locking means to bias said valve assembly and locking means to lock said valve assembly in valve open position, said mounting of the ballast arm also being positioned as to effect the unlocking of the valve assembly and movement of said valve into closed position under negative gravity forces or under predetermined inertia forces, discontinuance of said negative gravity or inertia forces and restoration of positive gravity forces effecting the repositioning of the valve to locked open position.

References Cited in the file of this patent

UNITED STATES PATENTS

| | | |
|---|---|---|
| 975,958 | Johnson | Nov. 15, 1910 |
| 1,235,079 | Supernaw | July 31, 1917 |
| 2,165,640 | Marx | July 11, 1939 |